United States Patent
Srinivas et al.

(10) Patent No.: US 7,903,625 B1
(45) Date of Patent: Mar. 8, 2011

(54) INTERNET-BASE-STATION-BASED TRAFFIC OFFLOAD ANALYSIS

(75) Inventors: Shilpa Kowdley Srinivas, Herndon, VA (US); Hemanth Balaji Pawar, Herndon, VA (US); Bhagwan Khanka, Lenexa, KS (US); Anoop K. Goyal, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 70 days.

(21) Appl. No.: 12/327,116

(22) Filed: Dec. 3, 2008

(51) Int. Cl.
*H04W 4/00* (2009.01)
(52) U.S. Cl. .......................... 370/338; 455/446
(58) Field of Classification Search .................. 370/252, 370/338, 401; 455/67.11, 423, 446
See application file for complete search history.

(56) References Cited

U.S. PATENT DOCUMENTS

| | | | |
|---|---|---|---|
| 6,169,895 B1 | 1/2001 | Buhrmann et al. | |
| 6,832,085 B1 | 12/2004 | McDonagh et al. | |
| 7,113,789 B1 | 9/2006 | Boehmke | |
| 7,248,876 B2 * | 7/2007 | Hirvonen | 455/446 |
| 2002/0072358 A1 | 6/2002 | Schneider et al. | |
| 2003/0040314 A1 * | 2/2003 | Hogan et al. | 455/435 |
| 2004/0204097 A1 | 10/2004 | Scheinert et al. | |
| 2005/0064820 A1 * | 3/2005 | Park et al. | 455/67.11 |
| 2006/0176844 A1 * | 8/2006 | Ogura | 370/328 |
| 2007/0190996 A1 * | 8/2007 | Asthana et al. | 455/420 |
| 2008/0176554 A1 * | 7/2008 | Gibbons et al. | 455/423 |
| 2009/0059822 A1 | 3/2009 | Morrill et al. | |
| 2009/0069008 A1 * | 3/2009 | Highsmith et al. | 455/424 |
| 2009/0149184 A1 * | 6/2009 | Hohne et al. | 455/437 |

\* cited by examiner

*Primary Examiner* — Ricky Ngo
*Assistant Examiner* — Kan Yuen (57) ABSTRACT

A method and system are provided for planning a service-provider network. The service-provider network includes a macro network and a number of low-cost internet base stations (LCIBs), where the macro network includes a number of macro base transceiver stations (BTSs). One or more LCIBs are selected. The selected LCIBs are instructed to operate in an unrestricted mode and then operate in the unrestricted mode for an evaluation period. After the evaluation period ends, an off-loaded-traffic amount is determined for at least a portion of the macro network for the evaluation period. The off-loaded-traffic amount is then associated with the one or more selected LCIBs. Then, the service-provider network is planned based on the off-loaded-traffic amount.

22 Claims, 5 Drawing Sheets

INTERNET-BASE-STATION-BASED TRAFFIC OFFLOAD ANALYSIS

BACKGROUND

Many people use mobile nodes, such as cell phones and personal digital assistants (PDAs), to communicate with wireless-communication networks. These mobile nodes and networks typically communicate over a radio-frequency (RF) air interface according to a wireless protocol such as Code Division Multiple Access (CDMA), perhaps in conformance with one or more industry specifications such as IS-95, IS-856, and IS-2000. Other protocols may be used instead or in addition, such as iDEN, TDMA, AMPS, GSM, GPRS, UMTS, EDGE, WiMAX (e.g., IEEE 802.16), LTE, microwave, satellite, MMDS, Wi-Fi (e.g., IEEE 802.11), and/or others.

Wireless-communication networks typically include a plurality of base transceiver stations (BTSs) or more generally "base stations", each of which provides one or more wireless coverage areas. Each wireless coverage area may be subdivided into areas termed "sectors". A mobile node positioned in a wireless coverage area can communicate over the air interface with the BTS, which typically provides the mobile node access to one or more circuit-switched, packet-switched, or other transport and/or signaling networks. Mobile nodes and BTSs conduct air-interface communication sessions (e.g., voice calls and data sessions) over radio frequencies known as "carrier frequencies" or simply "carriers." Using a sector as an example of a coverage area, a BTS may provide service in a given sector on one or more carriers.

The BTSs for these networks typically are not associated with any subscriber or small group of subscribers in particular; rather, they are placed in publicly-accessible locations and used by a wireless service provider's (WSP's) customers generally. These BTSs collectively blanket geographic areas with coverage; as such, they are referred to generally and herein as "macro BTSs"—and the network they collectively form, or to which they collectively belong, is referred to generally and herein as the "macro network."

From time to time, a WSP may change a macro network's infrastructure to manage call traffic and provide an expected quality of service, and/or for any other reason(s). This process may involve steps such as moving macro BTSs, changing (i.e., increasing or reducing) the number of sectors in macro-BTS coverage area(s), adding new macro BTSs, reallocating carriers among sectors, or otherwise adjusting antennas and other RF equipment. To decide when and where to change the macro network, a WSP may monitor the performance of the macro network. The performance of the macro network may include the amount of communication or "traffic" served by a network entity, such as a macro BTS. In particular, the amount of data traffic and/or voice traffic served network entities within the macro network may be used as indicators of macro-network performance.

To address gaps in macro-network coverage (e.g., poor in-building coverage) and for other reasons, macro-network service providers have recently begun offering devices referred to herein as Low-Cost Internet Base Stations (LCIBs). A typical LCIB will be installed in a building and may be approximately the size of a desktop phone or WiFi access point, and is essentially a low-power, low-capacity, low-cost version of a macro base station. Generally, an LCIB uses a normal power outlet, perhaps with a transformer providing a DC power supply. Typically, LCIBs have fairly comprehensive auto-configuration capabilities, such that they are largely "plug-and-play" to the user. An exemplary LCIB is the Sprint AIRAVE™ manufactured by Samsung Telecommunications America, LLC and sold by the Sprint Nextel Corporation.

LCIBs may also be referred to as femtocells, femto base stations, femto BTSs, picocells (pico base stations, pico BTSs), ubicells, microcells (micro base stations, micro BTSs), and perhaps by other names. The aforementioned terms that end in "cell" may also be generally and herein used interchangeably with the coverage area provided by the respective devices. Note also that "low-cost" is not used herein as a limiting term; that is, devices of any cost may be categorized as LCIBs, though most LCIBs typically will be less expensive on average than most macro-network base stations.

Many WSP subscribers, including private consumers and small businesses, in addition to having wireless service for their mobile node or nodes (which may include data service), also have a high-speed (a.k.a. "broadband") Internet connection for transmitting and receiving data packets through another communication channel. A typical subscriber may have a router connected to both to their high-speed Internet connection (e.g., cable modem) and to one or more devices, including an LCIB.

As such, LCIBs typically have a packet-communication interface that takes the form of a wired (e.g., Ethernet) or wireless (e.g., WiFi) connection with the user's router, providing connectivity to the Internet and/or one or more other packet-data networks via the user's broadband connection. An LCIB may establish a virtual-private-network (VPN) connection over the Internet with an entity (e.g., a VPN terminator) on the wireless-service (macro-network) provider's core network, and thereby be able to communicate securely with the VPN terminator and other entities on that core network and beyond.

A typical LCIB also has a wireless-communication (e.g., CDMA) interface that is compatible with the WSP subscriber's mobile node(s). The LCIB may act as a micro base station, providing coverage on the WSP's network via the user's Internet connection. Usually, an LCIB will provide service on a single RF carrier (or on a single carrier per technology, where multiple technologies (i.e., CDMA, EV-DO) are supported).

The LCIB may have an "authorized list" of mobile node(s) that are permitted to use the LCIB to communicate with the WSP's network. If the authorized list is used by the LCIB, any mobile node not on the authorized list will not be permitted to communicate with the WSP's network (i.e., denied communication). Rather, the unauthorized mobile node would have to communicate directly with the WSP's network using a standard air interface. The LCIB enforcing the authorized list may be referred to as the LCIB when operating in a "restricted mode". When the LCIB is not operating in the restricted mode, the LCIB may operate in an "unrestricted mode", where any mobile node within range of the LCIB may be permitted to communicate with the WSP's network using the LCIB.

An LCIB also may include a Global Positioning System (GPS) receiver for use in receiving and decoding GPS signals. The GPS receiver may be used to determine location and to synchronize operations with other LCIBs and with the macro network based on timing information embedded in GPS signals.

OVERVIEW

According to embodiments of the invention, a service-provider network may include a plurality of LCIBs, as well as a macro network. One or more LCIBs in the plurality of LCIBs may be selected. Each selected LCIB may be instructed to operate in an unrestricted mode. Each selected LCIB may operate in the unrestricted mode during an evaluation period of time. An off-loaded-traffic amount for the evaluation period may be determined for at least part of the macro network. The off-loaded-traffic amount may be associated with the selected LCIBs. The service-provider network may be planned based on the off-loaded-traffic amount.

In accordance with other embodiments of the invention, a system is provided. The system includes one or more LCIBs and a network-planning system (NPS). Each LCIB includes LCIB data storage, an LCIB processor, and machine-language instructions stored LCIB data storage, an LCIB processor, and machine-language instructions stored in the LCIB data storage and executable by the LCIB processor to perform LCIB functions. The LCIB functions include receiving a first instruction to operate in an unrestricted mode and responsively operating in the unrestricted mode and, after a evaluation period of time, receiving a second instruction to operate in a restricted mode and responsively operating in the restricted mode. The network-planning system includes NPS data storage, a NPS processor, and machine-language instructions stored in the NPS data storage and executable by the NPS processor to perform NPS functions. The NPS functions include determining the evaluation period, sending the first instruction to one or more LCIBs, after the evaluation period, sending the second instruction to the one or more LCIBs, determining an off-loaded-traffic amount based on the evaluation period, generating a network-planning direction based, at least in part, on the off-loaded-traffic amount, and outputting the generated network-planning direction.

These as well as other aspects and advantages will become apparent to those of ordinary skill in the art by reading the following detailed description, with reference where appropriate to the accompanying drawings. Further, it is to be understood that this overview and other descriptions provided herein do not necessarily limit the invention but are instead provided as examples only.

BRIEF DESCRIPTION OF THE DRAWINGS

Various exemplary embodiments are described herein with reference to the following drawings, wherein like numerals denote like entities, in which.

DETAILED DESCRIPTION

1. Overview

As stated, a WSP may determine the performance of a macro network using traffic amounts. WSPs may use traffic amounts in planning the macro network. However, traffic amounts of a macro BTS or a sector of a macro BTS may not provide enough information to determine a precise location for additional macro BTSs or additional sectors of a macro BTS. Therefore, the WSP may desire to gather traffic amounts in localized geographical areas, such as a coverage area of an LCIB, and use the traffic amounts gathered in LCIB-coverage areas to plan the macro network.

As stated above, an LCIB may operate in one of at least two modes: a restricted mode and an unrestricted mode. In particular, the LCIB may have an authorized list of mobile node (s) that are permitted to use the LCIB to communicate with the WSP's network. The LCIB may enforce the authorized list only while operating in the restricted mode; that is, the LCIB may deny mobile node(s) not on the authorized list from using the LCIB to communicate with the WSP's network. Also while operating in the restricted mode, the LCIB may communicate with mobile nodes within a restricted-mode coverage area. In contrast, while operating in the unrestricted mode, the LCIB may (i) serve mobile nodes not on the authorized list (i.e., not enforcing the authorized list) and/or (ii) change from a restricted-mode coverage area to an unrestricted-mode coverage area. In the unrestricted mode, the LCIB may increase signal strength so that the unrestricted-mode coverage area is larger than the restricted-mode coverage area. The LCIB may be configured to receive requests to selectively operate in the restricted mode or in the unrestricted mode.

To gather traffic amounts in localized areas, a network entity, such as a network planning system, may send a request to one or more LCIBs in a service provider network to operate in an unrestricted mode. The one or more LCIBs may have been selected by the network entity. In particular, the one or more LCIBs may be selected based on their respective locations; such as selecting one or more of the LCIBs within a coverage area of a given macro BTS or selecting all LCIBs within a specific geographic region (e.g., a given city block, neighborhood, town, county, state, or country).

Using an example in which one LCIB is instructed to operate in the unrestricted mode for an evaluation time period (and then instructed to resume operations in the restricted mode), the LCIB may respond to this request by operating in the unrestricted mode. Generally speaking, the LCIB operating in the unrestricted mode will have more traffic than while operating in the restricted mode. As such, traffic may be "off-loaded" or shifted from the macro network to the LCIB as a result of the restricted-mode request. After the evaluation period, the network entity may then send a request to the one or more LCIBs to operate in the restricted mode. The network entity may determine the evaluation period, which be a single period of time or a recurring period of time (e.g., the same period of time every day for a week). The network entity may gather traffic amounts for the evaluation period. The traffic amounts may be gathered from the LCIB and/or from one or more macro BTSs.

An off-loaded-traffic amount may be determined based on the gathered traffic amounts. In particular, the gathered traffic amounts may be compared to traffic amounts from the LCIB and/or one or more macro BTSs taken during a baseline period of time. For example, traffic amounts from the LCIB taken during the baseline period may be subtracted from the gathered traffic amounts taken during the evaluation period. The result of this subtraction may indicate the off-loaded-traffic amount during the evaluation period.

The service-provider network may be planned based on the off-loaded-traffic amount. In particular, the network entity may draw one or more maps indicating off-loaded-traffic amount(s) in a geographical area, which can then be used to plan the service-provider network. The network entity may generate network-planning directions for the service-provider network based on the off-loaded-traffic amounts, such as directions to add an LCIB, add a carrier to a macro BTS, increase a coverage area of a macro BTS, and/or add a macro BTS. The network-planning directions may then be executed.

Temporarily off-loading traffic to LCIB(s) and taking measurements of the off-loaded traffic, as described herein, enables gathering traffic amounts for local areas within a macro-BTS coverage area. Using existing LCIBs to gather traffic amounts saves the WSP capital, time, and effort to gather corresponding measurements, such as by use of temporary macro BTSs installed to gather off-loaded-traffic data. In particular locations, such as in upper floors of skyscrapers, the use of temporary macro BTSs may not be feasible due to the difficulty of installation.

Gathering measurements in local areas permits network planners to better plan the service-provider network within the macro-BTS coverage area. Further, network planners may be able to plan at a smaller scale, such as determining whether to add capacity (i.e., equipment, transmission power and/or carriers) within a sector of the macro-BTS coverage area or even to plan adding LCIBs to the service-provider network. Planning at smaller scales both enables the WSP to provide better network performance by adding needed capacity to specific areas, as well as saving capital and operating costs by adding less equipment and/or better-targeted equipment.

2. Exemplary Architecture a. An Exemplary Communication System

Figure 1A:
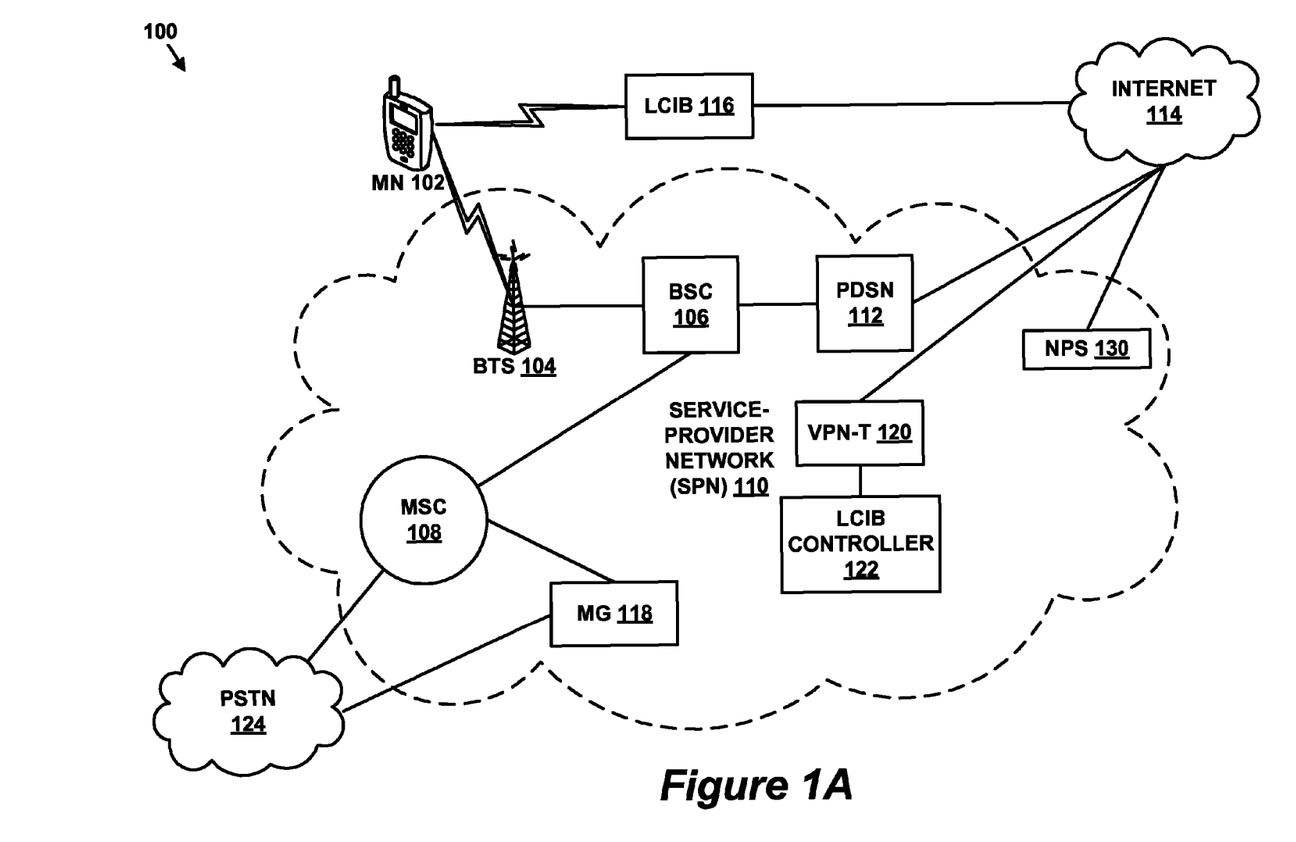
FIG. 1A is a simplified block diagram of a communication system, in accordance with exemplary embodiments.

FIG. 1A is a simplified block diagram of a communication system, in accordance with exemplary embodiments. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

As shown in FIG. 1A, a communication system 100 includes a mobile node (MN) 102, a macro BTS 104, a base station controller (BSC) 106, a mobile switching center (MSC) 108, a service-provider network (SPN) 110, a packet data serving node (PDSN) 112, the Internet 114, an LCIB 116, a media gateway (MG) 118, a VPN terminator (VPN-T) 120, an LCIB controller 122, a public switched telephone network (PSTN) 124, and a network-planning system (NPS) 130. Note that, in FIG. 1A and elsewhere in the Figures, dashed lines are used to indicate wireless communication links unless otherwise stated.

Note as well that additional network entities may be present, such as additional mobile nodes in communication with macro BTS 104, additional network entities in communication with Internet 114 and/or PSTN 124, etc. Also, there could be one or more devices and/or networks making up at least part of one or more of the communication links. For example, there could be one or more routers, cable modems, and/or other devices or networks on the communication link between the LCIB 116 and the Internet 114.

Mobile node 102 may be any mobile device arranged to carry out the mobile-station functions described herein. As such, mobile node 102 may include a user interface, a wireless-communication interface, a location interface such as a GPS-enabled chipset, a processor, and data storage comprising instructions executable by the processor for carrying out those mobile-station functions. The user interface may include buttons, a touch-screen, a microphone, and/or any other elements now known or later developed for receiving inputs, as well as a speaker, one or more displays, and/or any other elements for communicating outputs.

The wireless-communication interface may include an antenna and a chipset suitable for communicating with one or more macro base stations and/or one or more LCIBs over suitable air interfaces. For example, the chipset could be one that is suitable for CDMA communication. The chipset or wireless-communication interface in general may also or instead be able to communicate with other types of networks and devices, such as EV-DO networks, Wi-Fi networks, Bluetooth devices, and/or one or more additional types of networks and devices. The wireless-communication interface may also include the GPS-enabled chipset and/or other location module(s). The GPS-enabled chipset, processor, and data storage may be any suitable components known to those in the art. As examples, mobile node 102 could be or include a cell phone, a PDA, a computer, a laptop computer, a hybrid CDMA/EV-DO device, and/or a multi-mode cellular/Wi-Fi device.

Service-provider network (SPN) 110 may encompass all of the network entities depicted in FIG. 1A as being included within its boundary. In general, there may be more and/or different communication links among network entities within SPN 110, and there may be more and/or different connections between SPN 110 and outside entities. Furthermore, there may be a core packet network (not depicted) making up part of SPN 110, which may enable devices therein to communicate with each other. There may also be one or more other packet-data networks and/or elements, one or more circuit-switched networks and/or elements, one or more signaling networks and/or elements, and/or one or more of any other suitable network(s) and/or element(s).

Macro BTS 104 may be any network entity arranged to carry out the macro-BTS functions described herein. For example, the macro BTS 104 may comprise the elements of a computing unit 200 shown in FIG. 2. As such, macro BTS 104 may include a communication interface, a processor, and data storage comprising machine-language instructions executable by the processor to carry out those macro-BTS functions. The communication interface may include RF equipment (including one or more antennas), chipsets, and/or other components for providing one or more (e.g., CDMA) coverage areas such as cells and sectors, for communicating with mobile nodes such as mobile node 102 over an air interface. The communication interface may also include one or more wired (e.g., Ethernet) and/or wireless (e.g., WiFi) interfaces for communicating with at least BSC 106.

BSC 106 may be any network entity arranged to carry out the BSC functions described herein. For example, the BSC 106 may comprise the elements of the computing unit 200 shown in FIG. 2. As such, BSC 106 may include a communication interface, a processor, a user interface, and data storage comprising machine-language instructions executable by the processor to carry out those BSC functions. The communication interface may include one or more wired and/or wireless interfaces for communicating with at least macro BTS 104, MSC 108, and PDSN 112. In general, BSC 106 functions to control one or more macro BTSs such as macro BTS 104, and to provide those one or more macro BTSs with connections to devices on service-provider network 104.

Note that the combination of macro BTS 104 and BSC 106 may be considered a macro base station. However, macro BTS 104 and BSC 106 could, taken alone, be considered a macro base station as well. Furthermore, a macro base station may be considered to be either or both of those devices, and perhaps make use of one or more functions provided by MSC 108, PDSN 112, and/or any other entity, without departing from the invention. And it should be noted that the macro network and/or the LCIB(s) described herein may operate according to CDMA, EV-DO, iDEN, TDMA, AMPS, GSM, GPRS, UMTS, EDGE, WiMAX (e.g., IEEE 802.16), LTE, microwave, satellite, MMDS, Wi-Fi (e.g., IEEE 802.11), Bluetooth, infrared, and/or any other wireless technology or technologies now known or later developed.

MSC 108 may be any network entity arranged to carry out the MSC functions described herein. For example, the MSC 108 may comprise the elements of the computing unit 200 shown in FIG. 2. Thus, MSC 108 may include a communication interface, a processor, a user interface and data storage comprising machine-language instructions executable by the processor to carry out those MSC functions. The communication interface may include one or more wired and/or wireless interfaces for communicating with at least BSC 106, media gateway 118, and PSTN 124. In general, MSC 108 acts as a switch between PSTN 124 and BSCs such as BSC 106, and may also act as a switch between PSTN 124 and MG 118—in general, facilitating communication between SPN 110 and PSTN 124, which may be the public switched telephone network.

PDSN 112 may be any network entity arranged to carry out the PDSN functions described herein. For example, the PDSN 112 may comprise the elements of the computing unit 200 shown in FIG. 2. As such, PDSN 112 may include a communication interface, a processor, a user interface, and data storage comprising machine-language instructions executable by the processor for carrying out those PDSN functions. The communication interface may include one or more wired and/or wireless interfaces for communicating with at least BSC 108 and Internet 114. In general, PDSN 112 acts as a network access server between Internet 114 and BSCs such as BSC 108, facilitating packet-data communication between mobile nodes and Internet 114, via macro base stations.

Internet 114 may be the well-known global packet-data network generally referred to as the Internet. However, Internet 114 may also be or include one or more other packet-data networks, without departing from the scope and spirit of the present invention. As such, Internet 114 may include one or more wide area networks, one or more local area networks, one or more public networks, one or more private networks, one or more wired networks, one or more wireless networks, and/or one or more networks of any other type. Devices in communication with Internet 114 may exchange data using a packet-switched protocol such as the Internet Protocol (IP), and may be identified by an address such as an IP address.

LCIB 116 may be any computing and communication device arranged to carry out the LCIB functions described herein. For example, the LCIB 116 may comprise the elements of the exemplary LCIB described below in connection with FIG. 3. As such, LCIB 116 may include one or more communication interfaces, a processor, and data storage comprising instructions executable by the processor for carrying out those LCIB functions.

The communication interfaces may include a wireless-communication interface for communicating with one or more mobile nodes according to a protocol such as CDMA (and/or one or more other technologies), as well as a packet-communication (e.g., Ethernet or WiFi) interface for communicating with a device such as a router and/or a cable modem. LCIB 116 may also have a GPS receiver and/or other location module. LCIB 116 may be operable to receive one or more macro-network signals on the wireless-communication interface, determine a macro-network signal-strength value for each received macro-network signal, and send the one or more signal-strength values to a network entity, such as network-planning system 130.

Media gateway (MG) 118 may be any network entity arranged to carry out the MG functions described herein. For example, the MG 118 may comprise the elements of the computing unit 200 shown in FIG. 2. As such, MG 118 may include a communication interface, a processor, a user interface, and data storage comprising machine-language instructions executable by the processor for carrying out those media-gateway functions. The communication interface may include both a circuit-switched interface and a packet-switched interface. MG 118 may (a) receive packet-based communications from SPN 110, convert those to circuit-switched communications, and pass them to PSTN 124 (or MSC 108) and (b) receive circuit-switched communications from PSTN 124 (or MSC 108), convert those to packet-based communications, and pass them to SPN 110.

VPN terminator 120 may be any network entity arranged to carry out the VPN-terminator functions described herein. For example, the VPN terminator 120 may comprise the elements of the computing unit 200 shown in FIG. 2. Thus, VPN terminator 120 may include a communication interface, a processor, a user interface, and data storage comprising machine-language instructions executable by the processor for carrying out those VPN-terminator functions. The communication interface may include one or more wired and/or wireless interfaces for communicating with at least LCIB controller 122 and Internet 114. In general, VPN terminator 120 functions to establish secure VPN connections over Internet 114 with LCIBs such as LCIB 116, enabling the LCIBs to securely communicate with devices on SPN 110, such as LCIB controller 122, and perhaps beyond.

LCIB controller 122 may be any network entity arranged to carry out the LCIB-controller functions described herein. For example, the LCIB controller 122 may comprise the elements of the computing unit 200 shown in FIG. 2. Thus, LCIB controller 122 may include a communication interface, a processor, a user interface, and data storage comprising machine-language instructions executable by the processor for carrying out those LCIB-controller functions. The communication interface may include one or more wired and/or wireless interfaces for communicating with at least VPN terminator 120 as well as perhaps one or more other entities on SPN 110 and beyond.

Among other functions, LCIB controller 122 communicates via VPN terminator 120 with LCIBs such as LCIB 116. LCIB controller 122 may receive requests from various LCIBs for configuration data, and those requests may include, among other values, indications of the LCIBs' respective locations. LCIB controller 122 may also be operable to select various operational parameters for LCIBs (e.g., carrier, pseudo-random number (PN) offset, whether to broadcast a pilot beacon, contents of any pilot beacon to be broadcast, transmission-power level), and to transmit those parameters to LCIBs, perhaps along with other configuration data and messaging.

Network-planning system (NPS) 130 may be any device or collection of devices arranged to carry out the network-planning-server functions described herein. For example, the network-planning system 130 may comprise one or more servers, one or more other network entities, and/or the elements of the computing unit 200 shown in FIG. 2. The network-planning system 130 may receive one or more traffic amounts from a plurality of LCIBs. The network-planning system 130 may receive one or more traffic amounts from other sources as well, such as from a plurality of mobile nodes and/or a plurality of macro BTSs. The network-planning system 130 may store the one or more traffic amounts, and may send the one or more signal-strength values to a network entity, such as a network-map generator or network-planning director. The network-planning system 130 may send requests to some or all of the plurality of LCIBs to send the traffic amounts to the network-planning system 130. Alternatively, some or all of the plurality of LCIBs may send the traffic amounts periodically or otherwise without being requested by the network-planning system 130. The traffic amounts may be sent over the Internet 114 or via a VPN.

b. An Exemplary Scenario

Figure 1B:
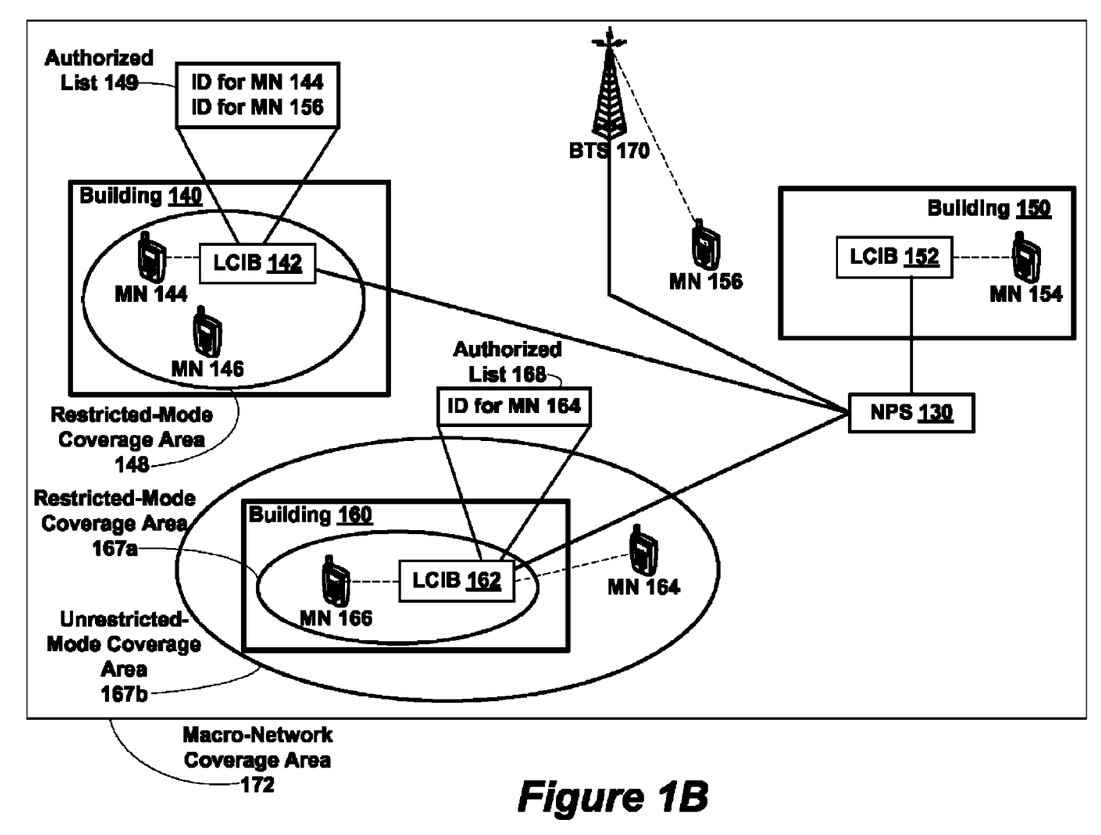
FIG. 1B is a simplified block diagram of an arrangement of communication entities, in accordance with exemplary embodiments.

FIG. 1B depicts an exemplary arrangement of communication elements, in which embodiments of the present invention may be carried out. Note that the arrangement shown in FIG. 1B is by way of example and not by way of limitation: additional and/or different elements could be present in a given scenario, without departing from the invention.

FIG. 1B depicts LCIBs 142, 152, and 162 in buildings 140, 150, and 160, respectively. Each LCIB 142, 152, and 162 may comprise the components shown in FIG. 3, which depicts an exemplary LCIB. FIG. 1B depicts wireless communication links between LCIB 142 and MN 144, between LCIB 152 and MN 154, and between LCIB 162 and MNs 164 and 166.

Each of LCIBs 142, 152, and 162 and macro BTS 170 are shown in FIG. 1B connected to a network-planning system 130. An LCIB or macro BTS may be connected to the network-planning system 130 via the Internet 114, via a VPN through VPN terminator 120, and/or via LCIB controller 122, among many other options. Again, all of this is by way of example.

Each of the LCIBs 142, 152, and 162 may determine traffic amounts for communications processed by the respective LCIB. For example, if LCIB 142 provides data service for MN 144 for a 15-minute long communication, the traffic amounts may indicate a duration of the communication (e.g., 15 minutes), a number of bytes transmitted during the communication, and/or one or more data rates established during the communication. Similarly, if LCIB 142 provides voice service for MN 144 for the 15-minute long communication, the traffic amounts may indicate a duration of the communication, telephony services used during the communication (e.g., 3-way calling or call waiting), and an indication of called party location, such as part or all of a telephone number or a domestic or international call indicator. And many other examples are possible as well.

Each of the LCIBs 142, 152, and 162 may operate in at least two modes, such as a restricted mode and an unrestricted mode. A given LCIB may operate in a given mode based on a request or command from a network entity, such as the network-planning system 130 and/or the macro BTS 170. Instead or in addition, the given LCIB may operate in the given mode based on requests or commands internally generated by the LCIB. And other examples are possible.

While operating in the restricted mode, each of the LCIBs 142, 152, and 162 may communicate with mobile nodes that are both within a restricted-mode coverage area and that are on an authorized list. Thus, mobile nodes that are within the restricted-mode coverage area but not on the authorized list may be denied communication services by an LCIB operating in the restricted mode. The authorized list for a given LCIB may be stored in data storage within the given LCIB and may include one or more identifiers, such as telephone numbers, mobile identification numbers (MINs), access codes, names, and/or similar identifiers that specify a particular mobile node and/or person.

In the scenario shown in FIG. 1B, LCIB 142 is operating in the restricted mode with an authorized list 149. The authorized list 149 includes an identifier (ID) for MN 144 but not an identifier for MN 146. Assume that both MN 144 and MN 146 request communication services from LCIB 142. FIG. 1B shows both MN 144 and MN 146 within the restricted-mode coverage area 148 indicating that LCIB 142 is within range to communicate with both MNs 144 and 146. FIG. 1B shows LCIB 142 communicating in a restricted mode with MN 144 but not in communication with MN 146. Thus, since MN 146 is not on the authorized list of LCIB 142, MN 146 will be denied communication services from LCIB 142, even though MN 146 is within the restricted-mode coverage area 148.

In the scenario shown in FIG. 1B, LCIB 162 is operating in the unrestricted mode (but has an authorized list 168). The authorized list 168 includes an identifier (ID) for MN 164 but not an identifier for MN 166. In the restricted mode, LCIB 162 would not permit communication with MN 166 as MN 166 is not on the authorized list 168 of LCIB 162. In the unrestricted mode, LCIB 162 provides communication services for both MN 164 and MN 166, as the unrestricted-mode coverage area 167b includes MN 164 and MN 166, and the authorization list 168 is ignored (i.e., not enforced).

Assuming macro BTS 170 is capable of providing communication services for MN 164 and MN 166 while within macro-network coverage area 172, then while LCIB 162 is operating in the restricted mode, MNs 164 and 166 may receive communication services from macro BTS 170. However, as shown in FIG. 1B, LCIB 162 provides communication services to MNs 164 and 166 while operating in the unrestricted mode. Thus, the communication services provided to MNs 164 and 166 have been off-loaded from macro BTS 170 to LCIB 162.

Accordingly, LCIB-traffic amounts for LCIB 162 during an "evaluation period", or a period of time LCIB 162 operates in the unrestricted mode, would indicate additional traffic from MNs 164 and 166 to LCIB 162 in this example. Similarly in this example, macro-BTS-traffic amounts for macro BTS 170 during the evaluation period would indicate less traffic, due to the off-loaded traffic.

Each of the LCIBs 142, 152, and 162 may send LCIB-traffic amounts to a network entity, such as, but not limited to, the network-planning system 130. Each of the LCIBs 142, 152, and 162 may send the traffic amounts via its packet-communication interface. Similarly, the macro BTS 170 may send macro-BTS-traffic amounts to the network entity as well. The LCIB-traffic amounts and/or the macro-BTS-traffic amounts may be sent by the respective one or more LCIBs and/or macro-BTSs periodically, upon request from the network entity, based on network conditions (e.g., sent when network utilization rates are under a threshold), or by use of some other strategy. The network entity may then receive LCIB-traffic amounts from the LCIBs 142, 152, and 162 and/or macro-BTS-traffic amounts from the macro BTS 170.

After the network entity receives the LCIB-traffic amounts and/or the macro-BTS-traffic amounts, as described above, the network entity may determine one or more off-loaded-traffic amounts. The network entity may determine the one or more off-loaded-traffic amounts by comparing received traffic amounts taken during the evaluation period to "baseline" traffic amounts taken during a baseline period of time.

For example, before the baseline period begins, the network entity may instruct one or more LCIBs to operate in the restricted mode (or the LCIBs may do so by default or based on user preference). Then, the network entity may receive LCIB-traffic amounts from the one or more LCIBs and/or macro-BTS-traffic amounts from one or more macro-BTSs representing traffic during the baseline period. After the baseline period ends and before the evaluation period begins, the network entity may instruct the one or more LCIBs to operate in the unrestricted mode during the evaluation period. Then, the network entity may receive LCIB-traffic amounts from the one or more LCIBs and/or macro-BTS-traffic amounts from one or more macro-BTSs representing traffic during the evaluation period.

The network entity may determine off-loaded-traffic amounts for the one or more LCIBs and/or one or more macro BTSs. To determine the off-loaded-traffic amounts, the network entity may determine a difference between the LCIB-traffic amounts and/or the macro-BTS-traffic amounts taken during the evaluation period and the LCIB-traffic amounts and/or the macro-BTS-traffic amounts taken during the baseline period. The network entity may determine the difference by either (i) subtracting LCIB-traffic amounts taken during the baseline period from the LCIB-traffic amounts taken during the evaluation period or (ii) subtracting macro-BTS traffic amounts taken during the evaluation period from macro-BTS traffic amounts taken during the baseline period.

The network entity may determine both the baseline period and the evaluation period. The baseline period and/or the evaluation period may be a single period of time (e.g., all of November, 2008 or 8 AM to 5 PM on Nov. 4, 2008), a collection of times (e.g., 9 AM to 10 AM on Oct. 4, 2008 and 8 PM to 10 PM on Nov. 7, 2008), a recurring period of time (e.g., 9:30 AM to 10:30 AM every weekday of November, 2008), and/or a combination of these periods of times. Other baseline periods and/or evaluation periods are possible as well.

3. An Exemplary Computing Unit

Figure 2:
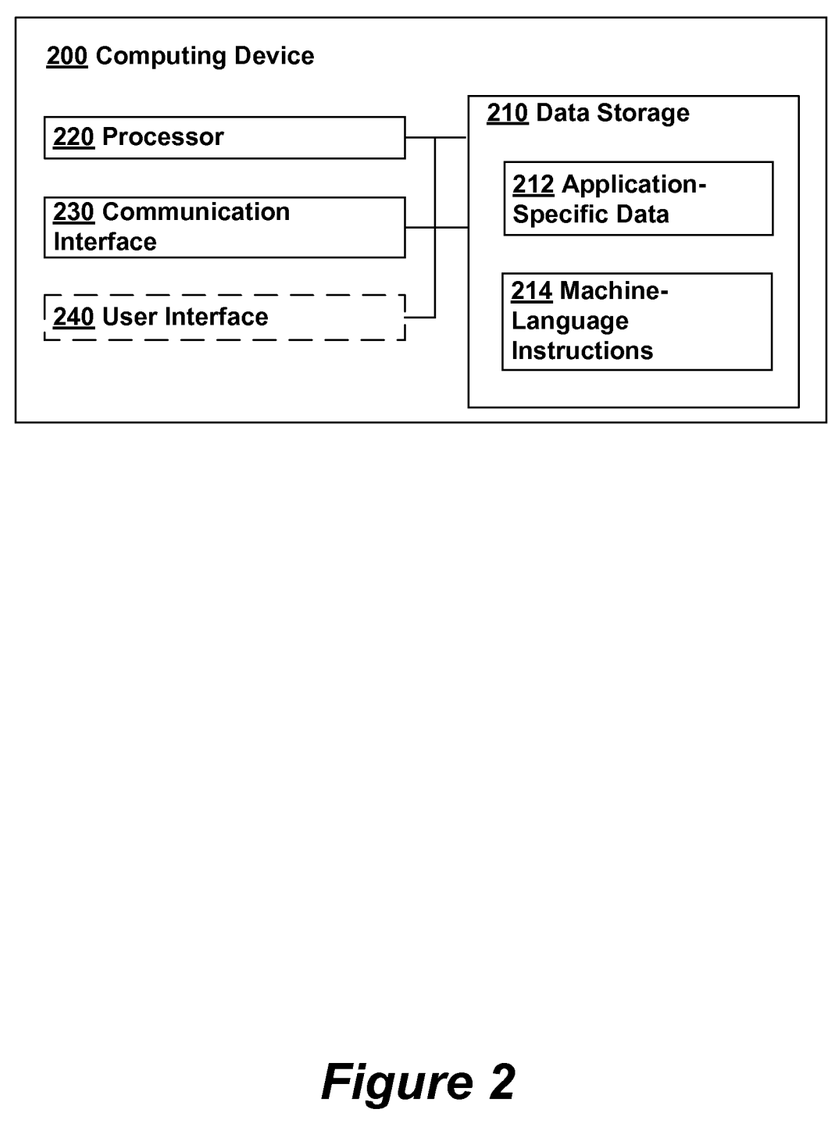
FIG. 2 is a simplified block diagram of an exemplary computing unit, in accordance with exemplary embodiments.

FIG. 2 is a block diagram of a computing unit 200, which comprises data storage 210, a processor 220, a communication interface 230, and a user interface 240. Note that computing unit 200 could have additional and/or different components, and that this structure is provided by way of example. As described herein, BSC 108, MSC 110, PDSN 112, media gateway 116, VPN terminator 120, LCIB controller 122 and/or network-planning system 130 may have a structure substantially similar to that of computing unit 200, as may at least part of one or more other entities, including but not limited to macro BTS 106.

The data storage 210 has sufficient storage capacity to store at least: (i) application-specific data 212 and (ii) machine-language instructions 214. The data storage 210 may comprise one or more storage devices now known or hereafter developed operable to store data, perhaps utilizing technologies such as read-only memory (ROM), random access memory (RAM), removable-disk-drive memory, hard-disk memory, magnetic-tape memory, and/or flash memory. The application-specific data 212 may comprise information, such as traffic amounts, used by one or more software applications executing on computing device 200.

The processor 220 may include one or more central processing units, computer processors, mobile processors, digital signal processors (DSPs), microprocessors, computer chips, and similar processing units now known or hereafter developed that execute machine-language instructions and process data. The machine-language instructions 214 contained in the data storage 210 include instructions executable by the processor 220 to perform some or all of the herein-described functions of the BSC 108, MSC 110, PDSN 112, MG 118, VPN terminator 120, LCIB controller 122 and/or network-planning system 130.

The communication interface 230 is configured to send and receive data and may include a wired-communication interface and/or a wireless-communication interface. The wired-communication interface, if present, may comprise a wire, cable, fiber-optic link or similar physical connection to a wide area network (WAN), a local area network (LAN), one or more public data networks, such as the Internet, one or more private data networks, or any combination of such networks. The wireless-communication interface, if present, may utilize an air interface, such as an IEEE 802.11 (e.g., Wi-Fi) or IEEE 802.16 (e.g., WiMAX) interface to a WAN, a LAN, one or more public data networks (e.g., the Internet), one or more private data networks, or any combination of public and private data networks.

The user interface 240 may receive user input from a user of the computing device 200 and/or display user output to the user. To receive user input, the user interface 240 may comprise a keyboard, a keypad, a touch screen, one or more buttons, a computer mouse, a track ball, a joystick, and/or other similar devices now known or hereafter developed capable of receiving user input. To display user output, the user interface 240 may comprise a cathode ray tube (CRT), a liquid crystal display (LCD), a light emitting diode (LED), a plasma display, a flat panel display, a display utilizing digital light processing (DLP) technology, a printer, and/or other similar devices now known or hereafter developed capable of displaying user output. The user interface 240 is shown in FIG. 2 as dashed to indicate that the user interface is optional; for example, the computing unit 200 may be an embedded processor without the user interface 240.

4. An Exemplary LCIB

Figure 3:
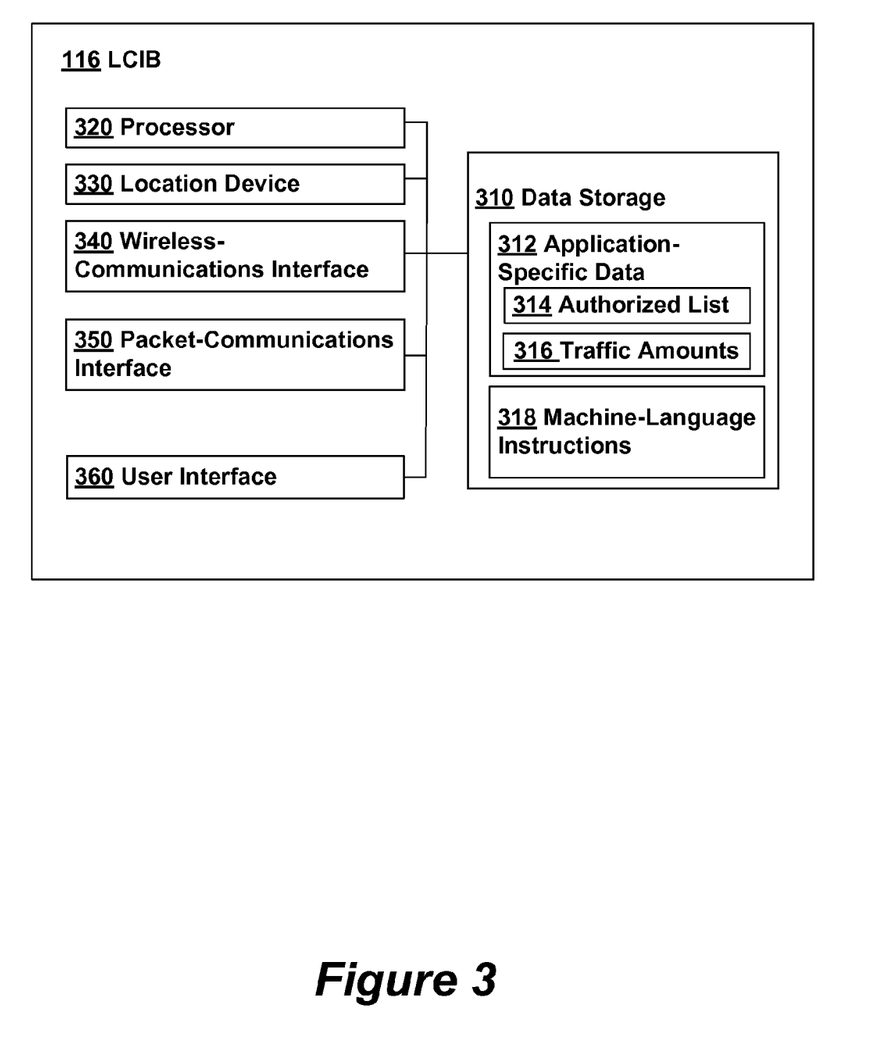
FIG. 3 is a simplified block diagram of an exemplary LCIB, in accordance with exemplary embodiments.

FIG. 3 is a block diagram of an LCIB 116, which comprises data storage 310, a processor 320, a location device 330, a wireless-communication interface 340, a packet-communication interface 350, and a user interface 360. The data storage 310 has sufficient storage capacity to store at least: (i) application-specific data 312 and (ii) machine-language instructions 318. The data storage 310 may comprise one or more storage devices now known or hereafter developed operable to store data, perhaps utilizing technologies such as read-only memory (ROM), random-access memory (RAM), removable-disk-drive memory, hard-disk memory, magnetic-tape memory, and/or flash memory. The application-specific data 312 may comprise information, such as an authorized list 314 and traffic amounts 316, that is used or generated by one or more software applications executing on LCIB 116. Note that LCIB 116 could have additional and/or different components, and that this structure is provided by way of example.

The processor 320 may include one or more central processing units, computer processors, mobile processors, digital signal processors (DSPs), microprocessors, computer chips, and/or similar processing units now known or hereafter developed that execute machine-language instructions and process data. The machine-language instructions 318 contained in the data storage 310 include instructions executable by the processor 320 to perform some or all of the herein-described functions of an LCIB.

LCIB 116 may also have a location device 330. The location device 330 may be any known or hereafter developed GPS receiver, suitable for receiving and decoding GPS signals for location and timing purposes, perhaps among other purposes. The location device 330 may also or instead use another location technology, such as inertial guidance or dead-reckoning.

The wireless-communication interface 340 may include one or more antennas, one or more chipsets, a set of one or more channel elements, and/or one or more other components suitable for providing a wireless coverage area, such as a macro-BTS coverage area, according to a wireless-communication protocol such as CDMA (and/or one or more other technologies).

The packet-communication interface 350 is configured to send data, such as traffic amounts, to a network entity, such as network-planning system 130. The packet-communication interface 350 may also be configured to receive one or more requests to operate in a restricted mode and/or an unrestricted mode. The packet-communication interface 350 may include a wired packet-communication interface and/or a wireless packet-communication interface. The wired packet-communication interface, if present, may comprise a wire, cable, fiber-optic link or similar physical connection to a WAN, a LAN, one or more public data networks, such as the Internet, one or more private data networks, or any combination of such networks. The wireless packet-communication interface, if present, may utilize an air interface to a WAN, a LAN, one or more public data networks (e.g., the Internet), one or more private data networks, or any combination of public and private data networks.

The user interface 360 may receive input from a user of the LCIB 116 and/or display output to the user. To receive input, the user interface 360 may comprise a keyboard, a keypad, a touch screen, one or more buttons, a computer mouse, a track ball, a joystick, and/or other similar devices now known or hereafter developed capable of receiving input. To display output, the user interface 360 may comprise a cathode ray tube (CRT), a liquid crystal display (LCD), a light emitting diode (LED), a plasma display, a flat panel display, a display utilizing digital light processing (DLP) technology, and/or other similar devices now known or hereafter developed capable of displaying output.

5. A Method for Planning a Service-Provider Network

Figure 4:
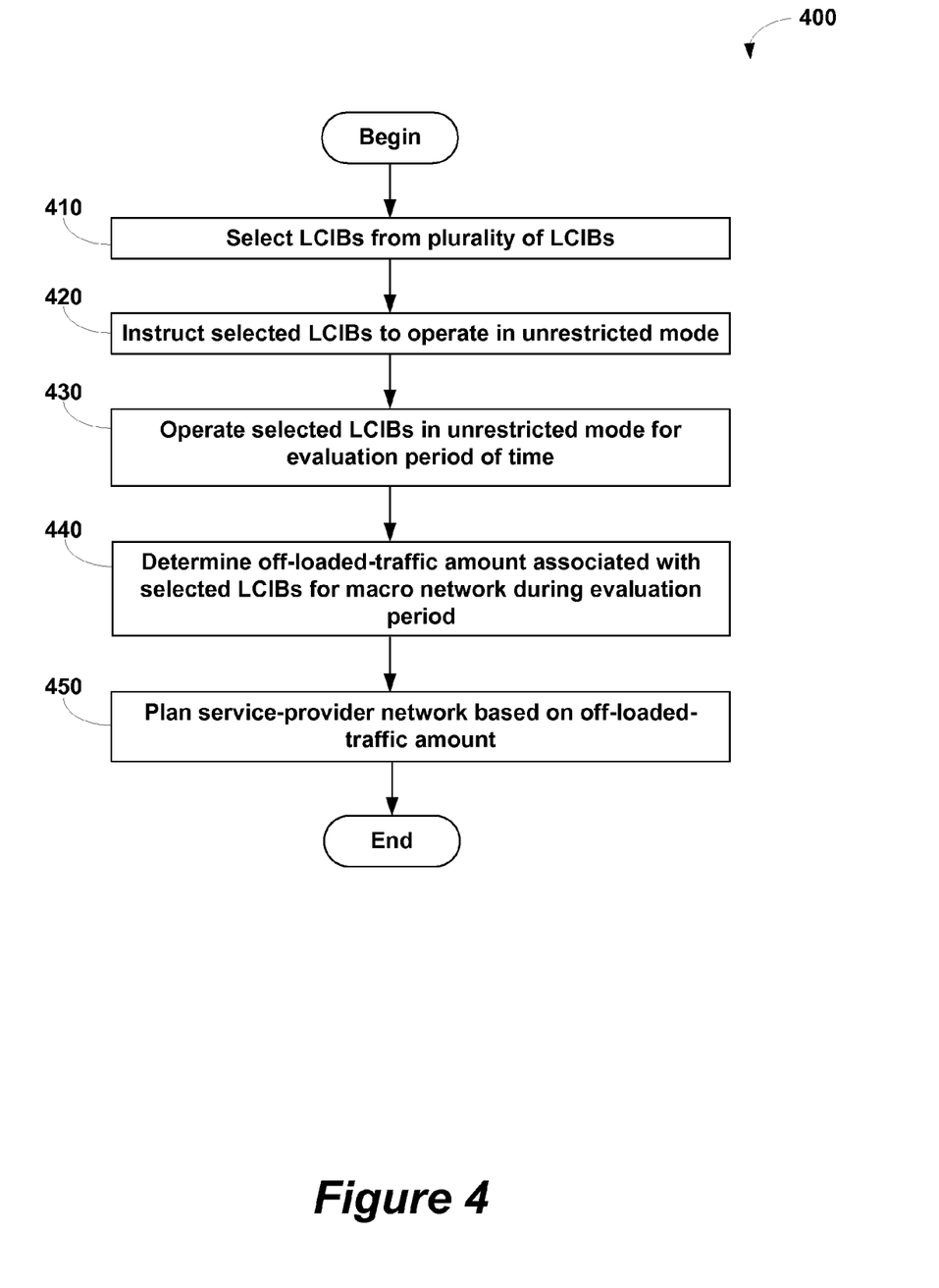
FIG. 4 is a flowchart of a method, in accordance with exemplary embodiments.

FIG. 4 depicts a flowchart of a method, in accordance with an exemplary embodiment. In particular, FIG. 4 depicts a method 400 for planning a service-provider network. The service-provider network may include a macro network and a plurality of LCIBs. The macro-network in turn may include a plurality of macro BTSs. Each block of the method 400 is further explained below.

It should be noted that method 400 may be carried out by any combination of LCIB 116, macro BTS 106, VPN terminator 120, LCIB controller 122, network-planning system 130, one or more other entities described herein, and/or one or more other entities not described herein, without departing from the scope and spirit of the present invention.

It should be understood that each block in this flowchart may represent a module, segment, or portion of computer program code, which includes one or more executable instructions for implementing specific logical functions or steps in the process. Alternate implementations are included within the scope of the example embodiments in which functions may be executed out of order from that shown or discussed, including substantially concurrently or in reverse order, depending on the functionality involved, as would be understood by those reasonably skilled in the art of the described embodiments.

As shown in FIG. 4, method 400 begins at block 410, when one or more LCIBs from the plurality of LCIBs are selected. To select the LCIBs, first one or more macro-network coverage areas may be selected. Each selected macro-network coverage area may be partially or wholly within a selected geographic region. The selected geographic region may be selected based on a known location (e.g., the region within 1 mile of the intersection of Main and Elm in Springfield), by selecting one or more city blocks, neighborhoods, towns, cities, counties, states, and/or countries, or using other criteria. Also, each selected macro-network coverage area may be associated with one or more macro BTSs. A group of LCIBs within at least one of the macro-network coverage areas then may be selected. Some or all LCIBs in of the group of LCIBs may have location devices and as such, the location device(s) may be used to determine the location(s) of LCIB(s) within the one or more macro-network coverage areas.

At block 420, the selected LCIBs may be instructed to operate in an unrestricted mode. One or more network entities, such as but not limited to a network-planning system, network-map generator and/or a network-planning director, may send a direction to each of the selected LCIBs to operate in the unrestricted mode.

At block 430, the one or more selected LCIBs may operate in the unrestricted mode for an evaluation period of time. The evaluation period of time may be determined by the one or more network entities. At the end of the evaluation period of time, the one or more network entities may send a direction to each of the LCIBs to operate in the restricted mode.

At block 440, an off-loaded-traffic amount may be determined for at least a portion of the macro network during the evaluation period. The off-loaded-traffic amount may be associated with the one or more selected LCIBs. For example, the off-loaded traffic amount may be based on a difference in traffic amounts received from the one or more selected LCIBs for a baseline period of time and traffic amounts received from the one or more selected LCIBs for the evaluation period, as described above with respect to FIG. 1B. Similarly, as the off-loaded traffic was off-loaded to the one or more selected LCIBs, the off-loaded traffic amount may be based on a difference in traffic amounts received from one or more macro-BTSs for the baseline period and traffic amounts received from the one or more macro-BTSs for the evaluation period, as also described above with respect to FIG. 1B.

At block 450, the service-provider network may be planned based on the off-loaded-traffic amount. To plan the service-provider network, one or more network planning directions may be generated by a network entity based on the off-loaded traffic amount. As used herein, the term "network-planning direction" includes things such as a map or an action item to adjust equipment within a macro network. Examples of action items to adjust equipment are: adding macro BTSs, removing macro BTSs, moving macro BTSs, changing the number of sectors in macro-BTS coverage areas, reallocating carriers among sectors, and/or adjusting radio-frequency (RF) equipment. And many other action items are possible.

A network-planning direction may be issued if the network entity determines that a macro BTS or other network equipment requires adjustment based on the off-loaded traffic values described above. For example, suppose a geographical region, which may or may not be completely within a macro-BTS coverage area, has a relatively-large off-loaded-traffic amount. The geographic region with the relatively-large off-loaded-traffic amount may be identified by: (i) identifying an off-loaded-traffic threshold value, perhaps algorithmically and/or by user input, (ii) identifying an area threshold value, perhaps algorithmically and/or by user input, (iii) identifying a contiguous area where off-loaded-traffic amounts are greater than or equal to the off-loaded-traffic threshold value, (iii) determining the size of the contiguous area, and (v) determining whether the size of the contiguous area is greater than or equal to the area threshold value.

Responsive to the determination that an area within the geographical region is a relatively-large area with relatively-large off-loaded-traffic amount, the network-optimization director may determine that equipment in one or more macro-BTS coverage areas requires adjustment. Example adjustments include, but are not limited to: increasing power at a macro BTS, increasing a number of carriers utilized by a macro BTS, and adding a macro BTS to the service-provider network. A network-planning direction to add a macro BTS to a geographical region may add macro-BTS coverage areas to the given geographical region, which may improve coverage in the given geographical region. Further, the addition of macro-BTS coverage areas may add capacity to process wireless communications within the given geographical region. Conversely, a network planning direction to remove a macro BTS from a given geographical area may decrease coverage and/or capacity to process wireless communications within the given geographical region. A network-planning direction to move a macro BTS from a source geographical region to a destination geographical region may reduce coverage and/or capacity in the source geographical region, while adding coverage and/or capacity to the destination geographical region.

A network-planning direction to change (i.e., increase or decrease) the number of sectors in a macro-BTS coverage area may alter the size and/or shape of the macro-BTS coverage area, and/or may add or remove capacity to process wireless communications. A network-planning direction to reallocate a carrier from a source sector to a destination sector may reduce capacity to the source sector and increase capacity in the destination sector.

Also, the network-planning direction may include one or more adjustments to RF equipment, such as changing the placement of antennas and/or antenna arrays and/or altering gain levels and other parameters of the RF equipment. The adjustments to RF equipment may change signal strengths within a macro-BTS coverage area generally, and within a sector, specifically. For example, increasing a gain level of RF equipment providing a carrier within a sector may increase the signal strength of the carrier within the sector.

Network-planning directions may be generated: (i) in response to a receiving a request to generate network-planning directions, (ii) in response to user input, (iii) at fixed intervals in time, (iv) after a fixed number of off-loaded-traffic amounts have been received, (v) using some other criteria, or some combination thereof.

As indicated above, another type of network-planning direction is a map. The map may show network planners and/or engineers where traffic was off-loaded as an aid to network planning, and may included selected geographic regions and/or macro-network coverage areas, and off-loaded traffic amounts in the geographic regions and/or macro-network coverage areas. The map may indicate off-loaded-traffic amounts within geographic regions and/or macro-network coverage areas numerically, graphically, and/or textually, among other options.

The off-loaded-traffic amounts may be indicated in a grey-scaled and/or color-coded fashion, wherein different shades of gray and/or colors indicate relative signal strengths within the actual coverage area. The off-loaded-traffic amounts may be indicated textually, such as by categories, e.g., "Small" for small off-loaded-traffic amounts, "Medium" for medium off-loaded-traffic amounts, and "Large" for small off-loaded-traffic amounts. The small, medium, and large amounts may be determined by user input, by a relative-weighting technique (e.g., the top ten off-loaded traffic amounts are "large", the next ten off-loaded traffic amounts are "medium", and the remainder are "small"), by a combination of user input and relative weighting, and/or by other techniques.

The network-planning directions generated for a plurality of macro-BTS coverage areas may be prioritized or otherwise arranged among the plurality of macro-BTS coverage areas. The prioritization may be based on a variety of factors, including but not limited to: observation of the network-coverage map(s) by network planners, technical concerns (i.e., relatively-high off-loaded-traffic amounts), actual and predicted communication patterns within macro-BTS coverage areas, budgetary concerns and limitations, governmental regulations, and strategic decisions (e.g., entry into or exit from a market). Based on prioritization of the network-planning directions, a macro-network-wide plan may then be formed for the actual movement, addition, removal, or adjustment of macro BTSs, carriers and/or RF equipment within the macro network and/or other action(s).

Note that executing the network-planning directions is separate and distinct from both the steps of generating the network-planning directions and planning the macro network. That is, the network-planning directions may be executed by the actual movement, addition, removal, or adjustment of macro BTSs, carriers and/or RF equipment, perhaps among other steps.

After completion of the procedures of block 450, method 400 may end.

6. Conclusion

Various exemplary embodiments have been described above. Those skilled in the art will understand, however, that changes and modifications may be made to those examples without departing from the scope of the claims.

What is claimed is:

1. A method carried out in a service-provider network comprising a macro network and a plurality of low-cost internet base stations (LCIBs), the macro network comprising a plurality of macro base transceiver stations (BTSs), the method comprising:

selecting one or more LCIBs of the plurality of LCIBs; instructing the one or more selected LCIBs to operate in an unrestricted mode; operating the one or more selected LCIBs in the unrestricted mode for an evaluation period of time, wherein operating a given LCIB in the unrestricted mode comprises the given LCIB permitting communication between the macro network and a mobile node that is not on an authorized list of mobile nodes for the given LCIB during the evaluation period;

determining an off-loaded-traffic amount for at least a portion of the macro network during the evaluation period, wherein the off-loaded-traffic amount is associated with the one or more selected LCIBs;

instructing the one or more selected LCIBs, including the given LCIB, to operate in a restricted mode after the evaluation period, wherein operating the given LCIB in the restricted mode comprises the given LCIB (i) permitting communication between the macro network and one or more mobile nodes on the authorized list of mobile nodes for the given LCIB and (ii) denying communication between the macro network and any mobile node not on the authorized list of mobile nodes for the given LCIB; and planning the service-provider network based on the off-loaded-traffic amount.

2. The method of claim 1, wherein the communication comprises data communication.

3. The method of claim 1, further comprising: prior to operating the one or more selected LCIBs in the unrestricted mode for the evaluation period, determining a baseline period of time; and operating the one or more selected LCIBs in the restricted mode during the baseline period; and determining a baseline-LCIB-traffic amount based on an amount of traffic processed by the one or more selected LCIBs during the baseline period.

4. The method of claim 3, wherein determining the off-loaded-traffic amount for the service-provider network during the evaluation period comprises:

determining an evaluation-LCIB-traffic amount, based on an amount of traffic processed by each LCIB in the plurality of LCIBs during the evaluation period; and determining an off-loaded-traffic amount based on the evaluation-LCIB-traffic amount and the baseline-LCIB-traffic amount.

5. The method of claim 4, wherein determining the off-loaded-traffic amount for the service-provider network comprises subtracting the baseline-LCIB-traffic amount from the evaluation-LCIB-traffic amount.

6. The method of claim 1, wherein operating the one or more selected LCIBs in the unrestricted mode comprises: at least one of the selected LCIBs increasing its coverage area from a restricted-mode coverage area to an unrestricted-mode coverage area during at least part of the evaluation period.

7. The method of claim 1, wherein selecting one or more LCIBs comprises:

selecting at least one macro-network coverage area;

identifying a first group of LCIBs, wherein the LCIBs in the first group are located in the at least one macro-network coverage area; and selecting the one or more LCIBs from the first group.

8. The method of claim 7, wherein selecting the at least one macro-network coverage area comprises:

determining a geographic region; and selecting the at least one macro coverage area from among those partially or completely within the geographic region.

9. The method of claim 7, wherein each of the one or more selected LCIBs comprises a location device; and wherein selecting the one or more LCIBs from the first group comprises using at least one such location device to determine a location of one or more LCIBs in the first group.

10. The method of claim 1, wherein planning the service provider network based on the off-loaded-traffic amount comprises:

sending the off-loaded-traffic amount to a network-planning system; generating at least one network-planning direction based on the off-loaded-traffic amount; and planning a macro network in accordance with the at least one generated network-planning direction.

11. The method of claim 10, wherein the at least one network-planning direction comprises at least one of a map, a direction to add a macro BTS, a direction to add a carrier at a macro BTS, a direction to add an LCIB, and a direction to increase power at a macro BTS.

12. The method of claim 10, further comprising: executing the at least one generated network-planning direction.

13. The method of claim 1, wherein the evaluation period is a recurring period of time.

14. A method carried out in a service-provider network comprising a macro network and a plurality of low-cost internet base stations (LCIBs), the macro network comprising a plurality of macro base transceiver stations (BTSs), the method comprising:

selecting one or more LCIBs of the plurality of LCIBs, wherein selecting the one or more LCIBs comprises: (i) selecting at least one macro-network coverage area, (ii) identifying a first group of LCIBs, wherein the LCIBs in the first group are located in the at least one macro-network coverage area, and (iii) selecting the one or more LCIBs from the first group;

prior to operating the one or more selected LCIBs in the first group in an unrestricted mode for an evaluation period of time, determining a baseline period of time;

operating the one or more selected LCIBs in a restricted mode during the baseline period, wherein operating a given LCIB in the unrestricted mode comprises the given LCIB permitting communication between the macro network and a mobile node that is not on an authorized list of mobile nodes for the given LCIB during the evaluation period, and wherein operating the given LCIB in the restricted mode comprises the given LCIB (i) permitting communication between the macro network and one or more mobile nodes on the authorized list of mobile nodes for the given LCIB and (ii) denying communication between the macro network and any mobile node not on the authorized list of mobile nodes for the given LCIB;

determining a baseline-macro-BTS-traffic amount based on an amount of traffic processed by the one or more selected BTSs during the baseline period, wherein each of the one or more selected BTSs is associated with the at least one macro-network coverage area;

instructing the one or more selected LCIBs to operate in the unrestricted mode;

operating the one or more selected LCIBs in the unrestricted mode for the evaluation period;

determining an off-loaded-traffic amount for at least a portion of the macro network during the evaluation period, wherein the off-loaded-traffic amount is associated with the one or more selected LCIBs; and planning the service-provider network based on the off-loaded-traffic amount.

15. The method of claim 14, wherein determining the off-loaded-traffic amount for the service-provider network during the evaluation period comprises:

determining an evaluation-macro-BTS-traffic amount, based on an amount of traffic processed by the one or more selected BTSs during the evaluation period; and determining an off-loaded-traffic amount based on the baseline-macro-BTS-traffic amount and the evaluation-macro-BTS-traffic amount.

16. The method of claim 15, wherein determining the off-loaded-traffic amount for the service-provider network comprises subtracting the evaluation-macro-BTS-traffic amount from the baseline-macro-BTS-traffic amount.

17. A system comprising:

(a) at least one low-cost Internet base station (LCIB), each LCIB comprising:

LCIB data storage, an LCIB processor, and machine-language instructions stored in the LCIB data storage and executable by the LCIB processor to perform LCIB functions including:

receiving a first instruction to operate in an unrestricted mode and responsively operating in the unrestricted mode, wherein operating in the unrestricted mode comprises permitting communication between the macro network and a mobile node that is not on an authorized list of mobile nodes during an evaluation period of time, and after the evaluation period of time, receiving a second instruction to operate in a restricted mode and responsively operating in the restricted mode, wherein operating in the restricted mode comprises (i) permitting communication between the macro network and one or more mobile nodes on the authorized list of mobile nodes, and (ii) denying communication between the macro network and any mobile node not on the authorized list of mobile nodes; and (b) a network-planning system (NPS) comprising:

NPS data storage, a NPS processor, and machine-language instructions stored in the NPS data storage and executable by the NPS processor to perform NPS functions including:

determining the evaluation period, sending the first instruction to one or more LCIBs, after the evaluation period, sending the second instruction to the one or more LCIBs, determining an off-loaded-traffic amount based on the evaluation period, generating a network-planning direction based, at least in part, on the off-loaded-traffic amount, and outputting the generated network-planning direction.

18. The system of claim 17, wherein the NPS functions further comprise:

identifying one or more macro-network coverage areas, wherein each of the one or more LCIBs is located in at least one of the one or more identified macro-network coverage areas;

determining a baseline period of time; and determining a baseline-LCIB-traffic amount based on an amount of traffic processed by the one or more LCIBs during the baseline period.

19. The system of claim 1, wherein determining the off-loaded-traffic amount based on the evaluation period comprises:

determining an evaluation-LCIB-traffic amount based on an amount of traffic processed by the one or more LCIBs during the evaluation period; and determining the off-loaded-traffic amount based on the evaluation-LCIB-traffic amount and the baseline-LCIB-traffic amount.

20. The system of claim 17, wherein the NPS functions further comprise:

identifying one or more macro-network coverage areas, wherein each of the one or more LCIBs is in at least one of the one or more identified macro-network coverage areas;

identifying one or more macro base transceiver stations (BTSs) that processes traffic in at least one of the one or more identified macro-network coverage areas;

determining a baseline period of time; and determining a baseline-macro-BTS-traffic amount based on an amount of traffic processed by the one or more identified macro BTSs during the baseline period.

21. The system of claim 17, wherein determining the off-loaded-traffic amount based on the evaluation period comprises:

determining a measured-macro-BTS-traffic amount based on an amount of traffic processed by the one or more identified macro-BTSs during the evaluation period; and determining the off-loaded-traffic amount based on the measured-macro-BTS-traffic amount and a baseline-macro-BTS-traffic amount.

22. The system of claim 17, wherein the at least one network-planning direction comprises at least one of a map, a direction to add a carrier to a macro BTS, a direction to add a macro BTS, a direction to add an LCIB, and a direction to increase power at a macro BTS.

* * * * *